M. SAULSON.
TORCHES.
No. 183,332. Patented Oct. 17, 1876.
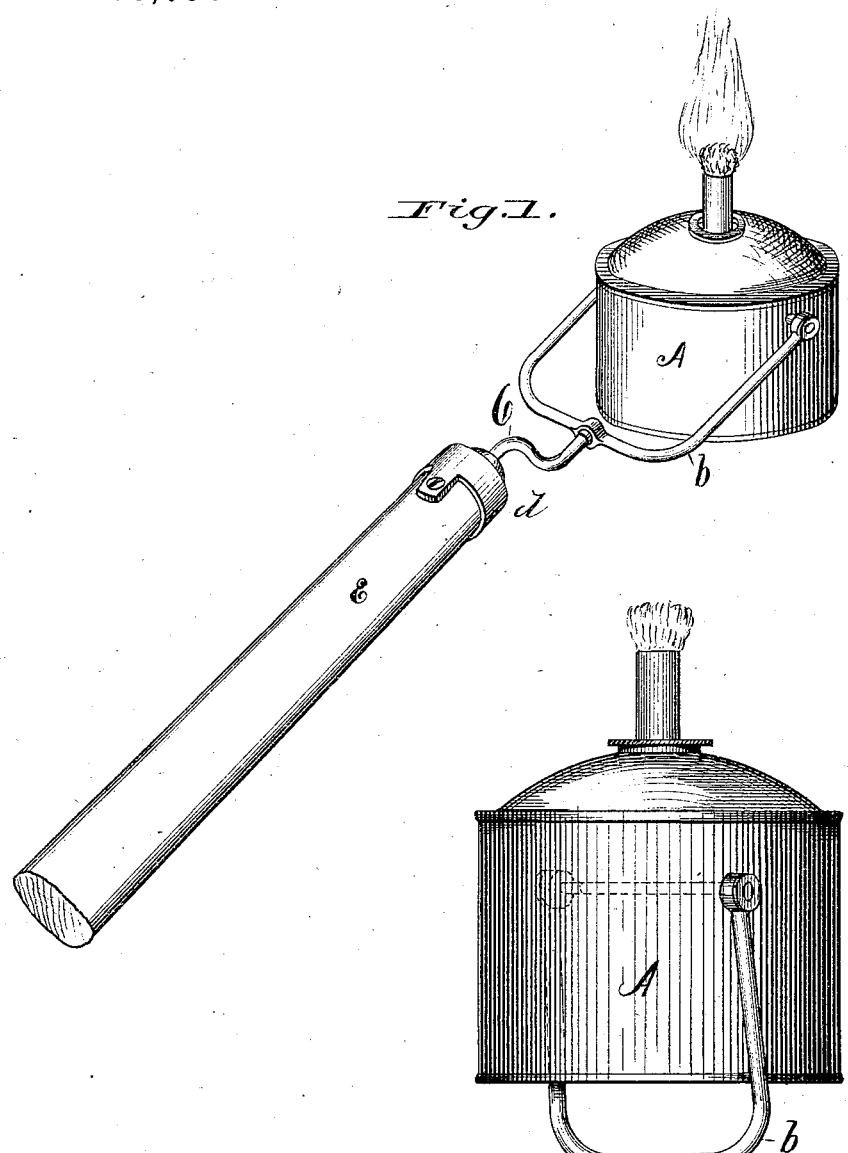
Fig. 1.
Fig. 2.
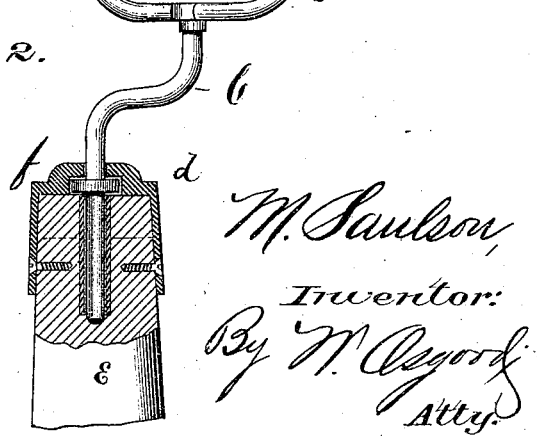
Attest:
H. L. Pennie
H. D. Hutton
M. Saulson,
Inventor:
By M. Osgood
Atty.

UNITED STATES PATENT OFFICE.

MORITZ SAULSON, OF TROY, NEW YORK, ASSIGNOR TO MINNIE SAULSON, OF SAME PLACE.

IMPROVEMENT IN TORCHES.

Specification forming part of Letters Patent No. 183,332, dated October 17, 1876; application filed June 23, 1876.

*To all whom it may concern:*

Be it known that I, MORITZ SAULSON, of Troy, county of Rensselaer and State of New York, have invented certain new and useful improvements in that class of devices known as "Torches," of which the following, in connection with the accompanying drawings, is a full, clear, and exact description.

Figure 1 is a perspective view, and Fig. 2 a section and elevation, of my improved torch.

The object of my invention is to provide a cheap and effective holder for torches, which shall cause the oil-cup to automatically assume a vertical position, irrespective of the position of the handle when in use; and it consists in combining, with the bowl or oil-cup, a bent shank, having at one end a pair of arms which are pivoted to said cup, and at the other end a swiveled connection with the torch-handle, as will be hereinafter more particularly described and pointed out in the claims.

The arms $b\ b$ are pivoted to the oil-cup A at a point above its center of gravity, so that, while freely swinging therein, the burner must always remain uppermost.

For the purposes of my invention these arms may be pivoted to the cup in any ordinary or well-known way; but I prefer to pass a rod through the oil-cup and through suitable eyes at the ends of the rods $b\ b$. This manner of swinging the cup obviates the objections made to those torches in which the pivots or bearings are soldered directly upon the exterior of the bowl, (or upon a ring surrounding the same,) in which instance the heat from the overflowing oil, which frequently becomes ignited, melts off the pivots, and thus damages the torch.

The shank C is bent in a plane perpendicular to the swinging axis of the bowl, and is swiveled upon the handle E.

It will be readily seen that the gravity of the torch and its bearings will cause the bent portion of the shank C to assume a position below the axis of the handle E, no matter what may be the inclination of said handle, and the torch being loosely pivoted, as above described, must always remain upright.

The particular means which I have chosen to illustrate the swivel connection between the shank C and handle E are briefly as follows: Near the end of the shank I form a hub, $f$, which is intended to bear against the thimble or ferrule $d$ when secured to the handle E. The handle is perforated for a short distance, to receive that portion of the shank which projects beyond the hub, and the whole is assembled as shown at Fig. 2.

I am thus enabled to produce a torch having all the advantages of the ordinary gimballed torch or lamp, and which is, at the same time, more simple, cheaper, and easier of construction.

Having now fully described my invention, what I claim as new, and desire to secure by Letters Patent, is—

1. The combination, as before set forth, of the bent shank C, having the arms $b$ pivoted to the torch-bowl, and the handle E, in which the said shank revolves, substantially in the manner described.

2. In a torch, the combination, with the bent shank C, having arms $b$ and a hub to prevent its withdrawal, of the ferrule $d$, attached to the handle E, as set forth.

In witness whereof I have hereunto set my hand this 16th day of June, 1876.

MORITZ SAULSON.

Witnesses:
N. DAVENPORT,
JOHN H. RIORDAN.